May 31, 1938. D. E. DASHER 2,119,317
REFRIGERATING APPARATUS
Filed March 20, 1936

INVENTOR.
DON. E. DASHER.
BY
Spencer, Hardman and Fahr.
HIS ATTORNEYS.

Patented May 31, 1938

2,119,317

UNITED STATES PATENT OFFICE 2,119,317

REFRIGERATING APPARATUS

Don E. Dasher, Dayton, Ohio, assignor to General Motors Corporation, Dayton, Ohio, a corporation of Delaware Application March 20, 1936, Serial No. 69,899

4 Claims. (Cl. 137—156.5)

The present invention relates to switches and particularly to expansible and contractable members employed to actuate such switches.

Considerable difficulty has been experienced in the past in closing and sealing an open end of an expansible and contractable member such as a bellows, employed to actuate a switch or a like device, without interfering with the free movement of the bellows or without impairing the durability thereof. For example, in closing and sealing an open end of such bellows to another element some of the metallic thermoplastic material employed to seal the open end to the element runs or flows into the bellows. The metallic sealing material flowing into the bellows, not being readily detectable from the exterior thereof, sometimes causes an excessive amount of this material to enter the bellows. This thermoplastic sealing material adheres to the corrugated wall surface of the bellows and upon cooling and hardening it interferes with the predetermined free movement of the bellows. If the predetermined free movement of the bellows is jeopardized in the manner described the life of the bellows is rendered indefinite. Also in closing and sealing an open end of a bellows to another element it quite frequently happens that heat applied to the joint of the bellows and the element to be sealed thereto is conducted to the corrugated expansible wall of body portion of the bellows and if this heating of the expansible body wall portion of the bellows is permitted to reach a predetermined intensity the heat will tend to harden the corrugated bellows wall thus destroying its flexibility and the free movement thereof. To destroy the flexibility of the corrugated bellows wall will impair the durability of the bellows. The present invention is therefore directed to an improved structure wherein the foregoing difficulties are eliminated.

An object of the present invention is to provide an improved joint between an expansible and contractable member and an element employed to close an open end thereof.

Another object of the present invention is to provide a joint between an expansible and contractable bellows and an element employed to close an open end of the bellows which joint is remote from the corrugated body portion of the bellows to thus permit sealing thereof by application of heat without materially heating the corrugated body portion of the bellows and which joint is constructed to prevent entrance of a sealing material into the interior of the bellows.

In carrying out the foregoing objects it is a further and more specific object of the invention to spin or roll a flange or wall portion provided at the open end of a bellows over a collar like member and to force a plug like portion of an element, employed to close the open end of the bellows, into engagement with the spun or rolled over flange portion of the bellows within the collar like member to cause a substantially fluid tight seal between the bellows, the collar member and the closure element.

Further objects and advantages of the present invention will be apparent from the following description, reference being had to the accompanying drawing, wherein a preferred form of the present invention is clearly shown.

Figure 1:
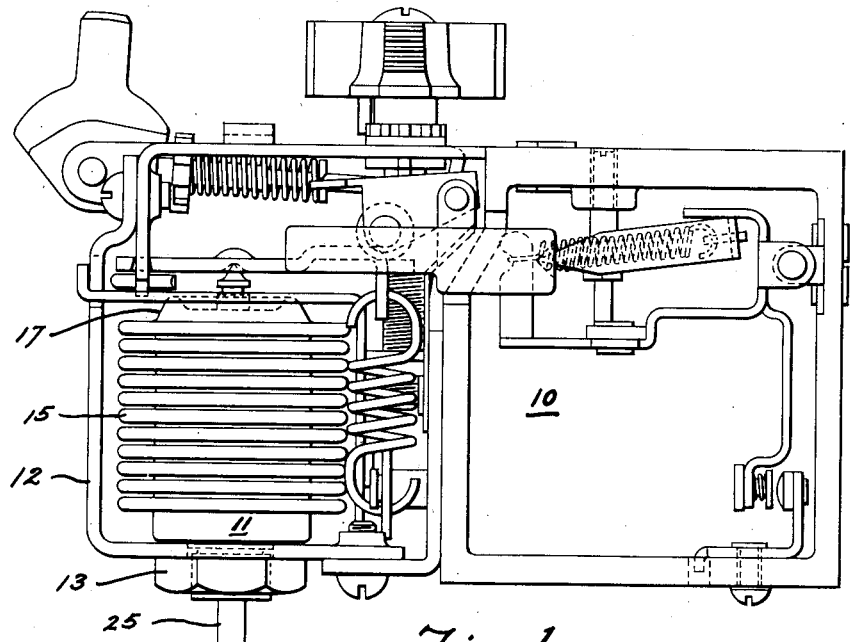
Fig. 1 is a view of a switch provided with a motor unit for actuating same including a bellows having my invention incorporated therein.

Referring to the drawing, for illustrating the invention, I have shown in Fig. 1 thereof a switch generally represented by the reference character 10. Switch 10 may be of any well known or conventional type including the usual arms or levers for actuating a contact, valve or the like. A motor unit, generally represented by the reference character 11, for moving the switch arms or levers may be mounted upon a bracket 12 secured to the switch 10 by a nut 13 which is threaded upon a portion of the unit extending through an opening provided in the bracket 12.

Figure 2:
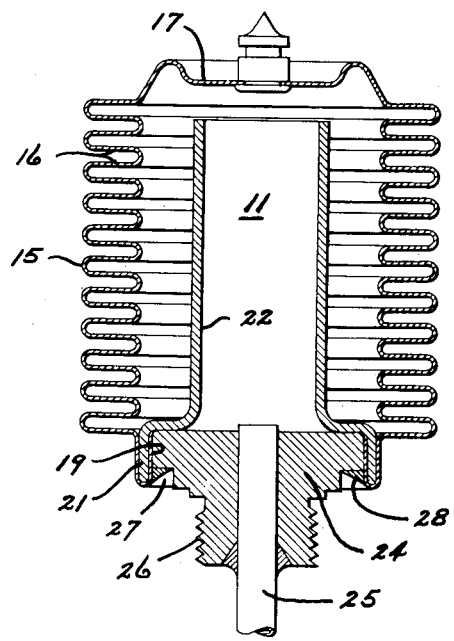
Fig. 2 is an enlarged vertical sectional view showing the motor unit which is mounted in the switch disclosed in Fig. 1.
Figure 3:
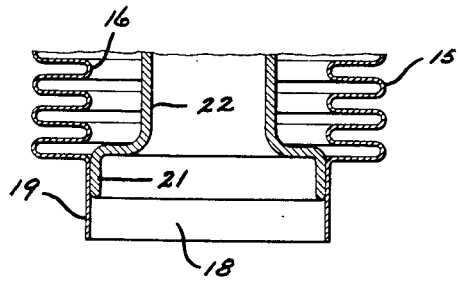
Fig. 3 is a fragmentary vertical sectional view of a bellows of the unit associated with a collar member and in a position prior to being secured thereto.

Referring now to Fig. 2 of the drawing it will be noted that the motor unit 11 includes an expansible or contractable bellows 15 having a body portion corrugated as at 16. The bellows 15 has a closed end 17 and an open end 18 (see Fig. 3) which is adapted to be closed in a manner and for a purpose to be hereinafter described. The closed end 17 of the bellows 15 may have a pointed button or the like secured thereto in any suitable manner for engagement with a pivoted arm or lever of the switch 10. The open end 18 of bellows 15 is provided with a flange or wall portion 19 (see Fig. 3) which extends outwardly from the corrugated body portion of the bellows. The wall portion or flange 19 provided on bellows 15 is adapted to be spun or rolled over a collar like portion 21 provided on a tube 22. The tube 22 is adapted to extend into the bellows 15 from the open end thereof to a point spaced a predetermined distance from the closed end 17 of the bellows. This tube 22 serves to limit the contracting movement of bellows 15 in motor 11 so as to prevent abnormal collapsing of the bellows beyond a limit which might cause breaking or cracking thereof. After the wall or flange portion 19 has been spun over the collar like member or portion 21 of tube 22 an element 24 is adapted to be pressed into the area defined by the collar like portion 21 of tube 22 for closing the open end of bellows 15. This element 24 may be in the form of a plug having a tube 25 extending therethrough and sealed thereto. The tube 25 is adapted to communicate with a thermostat bulb (not shown) which is ordinarily mounted in heat exchange relation with a heat dissipating or heat absorbing element so as to be affected by changes in temperature of the element. The thermostat bulb, tube or pipe 25 and bellows 15 of the motor unit 11 provide a closed circuit for a volatile fluid adapted to be sealed therein. The volatile fluid sealed within the elements of the motor unit described will vaporize and condense upon changes in temperature of the thermostat to cause expansion and/or contraction of the bellows 15 to render the motor unit 11 effective for actuating an arm or lever of switch 10. It will be noted that the plug element 24 is provided with a threaded shank portion 26 which is adapted to extend through the bracket 12 secured to switch 10 and is adapted to have the nut 13 threaded thereupon for securely mounting the motor unit 11 upon the switch. It will also be noted that the plug element 24 has a cut back or shoulder portion 27 provided thereon and which terminates short of the extension of the collar portion 21 on tube 22. This cut back portion 27 formed on the plug element 24 provides an exposed surface on the bellows adjacent the plug element and located remote from the main corrugated body portion of the bellows which surface is adapted to be bonded to the plug element. Therefore this exposed surface of bellows 15 is heated and simultaneously bonded to the plug element 24 by any suitable metallic thermoplastic bonding material such as a solder compound, indicated by the reference character 28, to insure a fluid tight seal for the motor unit 11 or a fluid tight joint between the bellows 15 and the element 24 employed for closing the open end thereof.

It will be apparent in view of the foregoing that I have provided an improved joint between an expansible and contractable member and an element employed to close an open end thereof. My improved joint is made remote from the main corrugated body portion of the expansible bellows and heating of this joint to cause sealing thereof by the thermoplastic bonding material does not materially affect or damage the movable body portion of the bellows. The closure element for the open end of the bellows fits tightly within the collar portion of the tube located within the bellows to thus prevent the flow of solder compound into the interior of the bellows. By eliminating the flow of solder into the bellows the free expansion or contraction movement thereof is not jeopardized by soldering a plug to its open end. It will be apparent that the tube located within the bellows serves to prevent any solder which might leak through the joint from being deposited upon the inner wall surface of the bellows and serves as well as a stop member for limiting the collapsing movement of the bellows.

My improved joint can be made at low cost and eliminates the difficulties hereinbefore enumerated in making such joints.

While the form of embodiment of the present invention as herein disclosed, constitutes a preferred form, it is to be understood that other forms might be adopted, all coming within the scope of the claims which follow.

What is claimed is as follows:

1. A motor unit for actuating a switch or the like device comprising in combination, an expansible and contractable bellows, said bellows having a main corrugated body portion and a normally open end extending from the body portion thereof, means for closing the normally open end of said bellows, said means including a collar like member and a plug element, the wall of said bellows at the open end thereof fitting over and being formed into engagement with the inner wall surface of said collar member, said plug element having a surface registering with the wall of said bellows formed over and into engagement with the inner wall surface of said collar member, said plug element also being provided with a surface adjacent the first named surface thereon and adapted to be sealed to the wall of the bellows formed over said collar member by a thermoplastic material, said sealing surface on said plug element being located remote from the main body portion of the bellows to permit application of heat to said sealing surface without materially affecting the temperature of the corrugated main body portion of the bellows, and said surface on said plug element registering with the wall of said bellows formed over and into engagement with the inner wall surface of said collar member being tightly fitted against said wall to rigidly clamp the collar member to the bellows and to prevent flow of the thermoplastic material into the interior of the bellows.

2. A motor unit for actuating a switch or the like device comprising in combination, an expansible and contractable bellows, said bellows having a main corrugated body portion and a normally open end extending from the body portion thereof, means for closing the normally open end of said bellows, said means including a collar like member and a plug element, the wall of said bellows at the open end thereof fitting over and being formed into engagement with the inner wall surface of said collar member, said plug element having a surface registering with the wall of said bellows formed over and into engagement with the inner wall surface of said collar member, said plug element also being provided with a surface adjacent the first named surface thereon and adapted to be sealed to the wall of the bellows formed over said collar member by a thermoplastic material, said sealing surface on said plug element being located remote from the main body portion of the bellows to permit application of heat to said sealing surface without materially affecting the temperature of the corrugated main body portion of the bellows, said surface on said plug element registering with the wall of said bellows formed over and into engagement with the inner wall surface of said collar member being tightly fitted against said wall to rigidly clamp the collar member to the bellows and to prevent flow of the thermoplastic material into the interior of the bellows, and said collar member having a part extending from the part thereof engaged by the wall of said bellows and forming a shoulder adapted to be engaged by said plug element for spacing the sealing surface of the plug element from the end of the bellows.

3. A motor unit for actuating a switch or the like device comprising in combination, an expansible and contractable bellows, said bellows having a main corrugated body portion, a closed end and a normally open end, means for closing the normally open end of said bellows, said means including a collar like member and a plug element, the wall of said bellows at the open end thereof fitting over and being formed into engagement with the inner wall surface of said collar member, said plug element having a surface registering with the wall of said bellows formed over and into engagement with the inner wall surface of said collar member, said plug element also being provided with a surface adjacent the first named surface thereon and adapted to be sealed to the wall of the bellows formed over said collar member by a thermoplastic material, said sealing surface on said plug element being located remote from the main body portion of the bellows to permit application of heat to said sealing surface without materially affecting the temperature of the corrugated main body portion of the bellows, said surface on said plug element registering with the wall of said bellows formed over and into engagement with the inner wall surface of said collar member being tightly fitted against said wall to rigidly clamp the collar member to the bellows and to prevent flow of the thermoplastic material into the interior of the bellows, said collar member having a part extending from the part thereof engaged by the wall of said bellows and forming a shoulder adapted to be engaged by said plug element for spacing the sealing surface of the plug element from the end of the bellows, and said collar member having a continuation of the shoulder formed thereon extending into the bellows to a point spaced from the closed end thereof and providing a stop for limiting the contracting movement of the bellows.

4. A motor unit for actuating a switch or the like device comprising in combination, an expansible and contractible member, said member having a main body portion and a normally open end extending from the body portion thereof, means for closing the normally open end of said member, said means including a collar-like element and a plug element, the wall of said member at the open end thereof fitting over and being formed into engagement with the inner wall surface of said collar element, said plug element having a surface registering with the wall of said member formed over and into engagement with the inner wall surface of said collar element, said plug element also being provided with a surface adjacent the first named surface thereon and adapted to be sealed to the wall of the member formed over said collar element, said sealing surface on said plug element being located remote from the main body portion of said member, and said surface on said plug element registering with the wall of said member formed over and into engagement with the inner wall surface of said collar element being tightly fitted against said wall to rigidly clamp the collar element to the member.

DON E. DASHER.